No. 699,558. Patented May 6, 1902.
F. ORTHMANN.
FIRE ESCAPE.
(Application filed Jan. 18, 1901.)
(No Model.)

WITNESSES:
F. W. Wright.
J. C. Connor

INVENTOR
FREDERICK ORTHMANN
BY
Howson and Howson
HIS ATTORNEYS

UNITED STATES PATENT OFFICE.

FREDERICK ORTHMANN, OF BROOKLYN, NEW YORK.

FIRE-ESCAPE.

SPECIFICATION forming part of Letters Patent No. 699,558, dated May 6, 1902.

Application filed January 18, 1901. Serial No. 43,720. (No model.)

*To all whom it may concern:*

Be it known that I, FREDERICK ORTHMANN, a citizen of the United States of America, residing in the borough of Brooklyn, county of Kings, State of New York, have invented an Improved Fire-Escape, of which the following is a specification.

My invention relates to fire-escapes, more particularly of that class in which a rope is combined with a friction-block constructed to require the rope to pass through the block in a tortuous course; and the main object of my invention is to construct the device in a simple and inexpensive but efficient form and so that the degree of friction will be automatically proportioned to the load.

My invention relates, further, to an improved construction of bracket for supporting the apparatus and a rope-grip.

Figure 1:
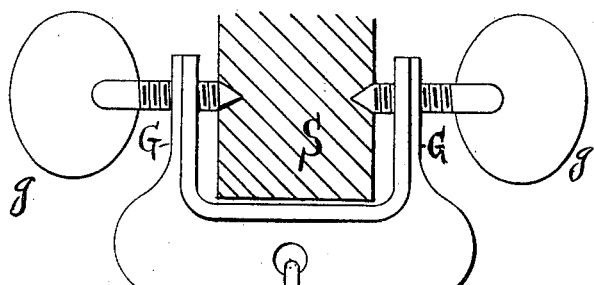
Figure 2:
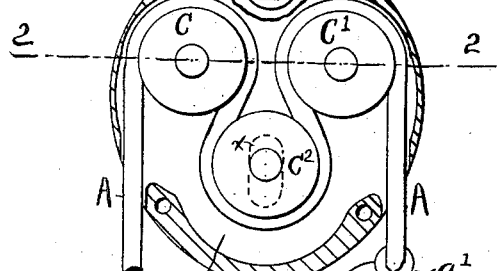
Figure 6:
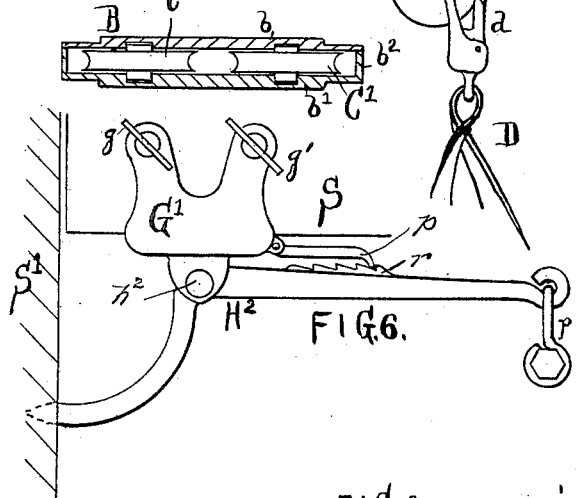
Figure 3:
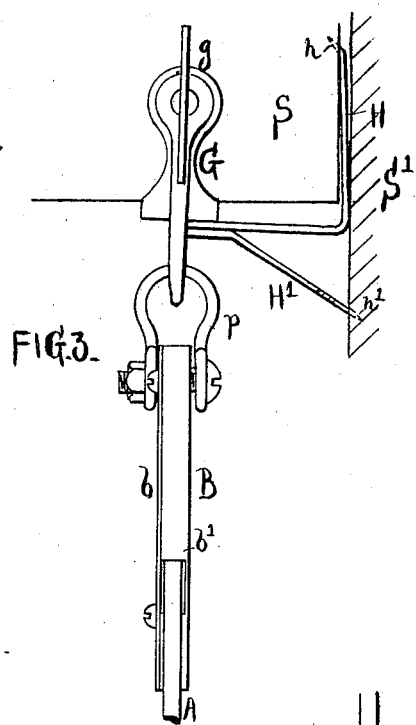
Figure 5:
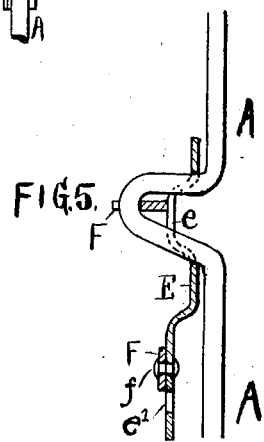
Figure 4:
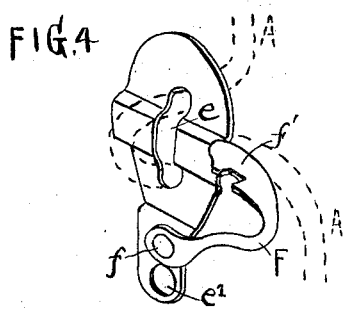

In the accompanying drawings, Figure 1 is a vertical section. Fig. 2 is a sectional plan on the line 2 2, Fig. 1. Fig. 3 is a side view of the supporting-bracket illustrated in Fig. 1. Fig. 4 is a perspective view of a rope-grip. Fig. 5 is a vertical section of the same, and Fig. 6 is a view of a modified form of bracket.

Referring to Figs. 1 and 2, A is the rope, which should preferably be wire rope, and B is the friction-block, through which the rope passes in a tortuous course. The casing of this block may be conveniently made flat and disk-like, the front and back plates $b$ and $b'$ being secured together by bolts or screws. I prefer to provide either the front or back plate with flanges $b^2$ to close up the sides of the space between the plates except where the rope passes in and out. This block is provided with three pulleys C, C', and C², one below and two above, as shown in Fig. 1, and these three pulleys have journals in bearings in the casing or turn on journals in the casing. I provide slotted bearings for the bottom pulley only, as indicated by the dotted line $x$ in Fig. 1, while the two upper pulleys turn in round or fixed bearings. The peripheries of the pulleys are grooved, Fig. 2, to receive the wire rope, which passes in and out over the two upper pulleys and under the lower pulley in a loop, Fig. 1.

Each end of the rope A may have any suitable means for securing to it a suitable band or loop or other attachment D, Fig. 1, in which the person to be lowered may be suspended. In Fig. 1 I have shown one end of the rope as provided with a ball $a$ and link $a'$, into which may be engaged the snap-hook $d$ of the band or loop. When a person has descended at this end of the rope, the other end of the rope will have been drawn up to the block, ready for attachment of a like band, loop, or other descending means. To enable a person to attach himself to the rope at any intermediate point, however, I provide the locking-grip shown in Figs. 4 and 5. This consists of a suspending-plate E, preferably bent, as shown in the drawings, and having a slot $e$, through which a bight of the wire rope may be thrust, and then a latch F, hinged at $f$ to the plate, can have its notched end $f'$ thrust through the bight of the rope, thus locking the rope in such a sharply-kinked loop or bight that when a band or loop D is suspended from the eye $e'$ at the bottom of the plate E and a person slung in it the plate will not slip on the rope.

As a suitable means of suspending my rope and friction-block I prefer the construction of bracket I will now describe. In the form shown in Figs. 1 and 3 the bracket comprises a U-shaped jaw G to embrace the bottom of a window-sash S and to be secured thereto by thumb-screws $g\ g$, while an upwardly-bent leg H on this jaw G is passed into the space between the sash S and the frame S', inwardly-bent teeth $h$ at the top of this leg being embedded in the side of the sash. Another leg H', extending downwardly from the jaw G, has teeth $h'$ at its lower end to embed themselves in the frame S'. The rope and block are in in this case suspended directly from the jaw G by a loop $p$; but the bracket is so attached to the window-sash that the greater the weight put upon the rope and block the more will the legs H and H' embed themselves in the sash and frame by reason of the bracket turning upon the thumb-screws $g\ g$ as a center.

In Fig. 6 I have shown a slightly-modified form of bracket in which a U-shaped jaw G' is clamped to the bottom of the window-sash by thumb-screws $g'\ g'$ (two on one side) to hold the jaw from rocking, and a lever H² pivoted at $h^2$ to the jaw engages at one end against the frame and at the other supports the block and rope by a loop $p$. To make the lever H² steadier and firmer in the position to which it may be adjusted, I may provide the lever with a ratchet $r$, with which engages a pawl $p$ pivoted upon the jaw.

From the foregoing description it will be readily seen that with the system of three simple pulleys described when a weight is put upon the rope the bottom pulley in the loop of the rope is drawn up to the other two (or they are drawn together) to bind the rope with a friction proportional to the weight put upon the rope, and the parts having been proportioned in the first instance the device will work in an automatic manner and in perfect safety.

I claim as my invention—

1. A fire-escape, comprising a rope, in combination with a friction-block and three pulleys therein, two above, over which the rope passes on its way in and out, while the third pulley is below for the rope to pass around it in a loop, the two upper pulleys being in fixed bearings, while the third and lower pulley is freely movable toward and from the first two so as to grip the rope between them, substantially as described.

2. The combination with the rope of a fire-escape, of a detachable suspending-plate having an eye $e'$, and a slot through which a bight of the rope may be passed, and a locking-latch hinged to the plate on one side of the slot and adapted to swing in a path substantially at right angles to and through a bight of rope thrust through the slot, whereby the plate may be locked to a bight of the rope at any point, substantially as described.

3. The combination with the rope and block of a fire-escape, of a bracket provided with means for clamping it to a window-sash, a suspending device secured to the bracket, and a gripping-leg carried by the bracket and having its end pointed and extending downwardly at an angle from the bracket and adapted to enter and engage the window-frame in a plane parallel to the window-sash, substantially as described.

In testimony whereof I have signed my name to this specification in the presence of two subscribing witnesses.

FREDERICK ORTHMANN.

Witnesses:
 WALTER R. BEACH,
 HUBERT HOWSON.